Patented Oct. 12, 1948

2,451,116

UNITED STATES PATENT OFFICE 2,451,116

METHOD OF RECOVERING ALBUMIN ADHERING TO EGG SHELLS

Frederick F. Pollak, New York, N. Y.

No Drawing. Application March 8, 1947, Serial No. 733,431

6 Claims. (Cl. 260—122)

This invention relates to a method for the purification of egg juice and for the recovery of a pure light colored soluble albumin from the same.

Commercial egg juice is a watery albumin containing suspension or solution which is obtained as a wash product from the treatment of the egg shells. For this purpose the egg shells are either centrifuged or leached with water and the same quantity of the solvent is repeatedly contacted with fresh shells to obtain a sufficiently concentrated albumin solution.

This solution or suspension also contains a considerable quantity of egg yolk and the separation of this egg yolk from the albumin solution represents a rather difficult problem.

This problem was solved by me in conformity with U. S. Patent #2,377,961 by treating the egg juice with butyl, amyl, isobutyl or isoamyl esters of lower fatty acids and preferably with butylacetate whereby the oily component of the egg juice is dissolved in the water insoluble extracting agent. Hereupon the lipoids also present in the egg juice and the egg yolk oil solution are separated from the watery albumin solution.

This process yields fairly satisfactory results, but it has certain grave disadvantages.

The above mentioned lower fatty acid esters and also the butylacetate have a low flash point; therefore, they involve a dangerous fire hazard, especially when, which is the rule in large scale manufacture, the work is carried out in open tanks. Moreover, these esters have a low boiling point and losses of the rather expensive extracting agents are unavoidable.

Another serious drawback of the butylacetate application results from its restricted water solubility.

The egg juice does not contain more than 9–10% of solute. The solubility of butylacetate in water is about .5%. If, for instance, 1000 lbs. of egg juice are extracted with 90 lbs. of butylacetate, a loss of 5 lbs. butylacetate will result which is 5–5.5% of the entire applied quantity and 0.5 lb. for each lb. of recovered albumin.

The further grave disadvantage arises that the butylacetate which is dissolved in water of necessity contains egg yolk. Even if the filtered solution seems to be free of the latter, it becomes turbid after a comparatively short time due to the evaporation of the butylacetate and distribution of the precipitated egg yolk in the solution. The necessity arises to repeat the filtering step or to repeatedly shake-out the solution with the solvent.

It is the object of this invention to eliminate the above recited operative difficulties and disadvantages in the separation of the egg yolk from the egg juice and to thereby greatly simplify the recovery of the albumin.

It is a further object of the invention to produce an albumin of a high purity.

It is also an object of the invention to avoid the contamination of the albumin solution with dissolved egg yolk oil or other impurities and to, therefore, dispense with additional purifying steps, such as repeated filtering and the like.

It is also an object of the invention to avoid losses of the extracting agent and to exclude fire hazards.

With these objects in view the invention comprises broadly the use of menthene alcohols for the removal of the egg yolk and other impurities from the egg juice.

As a preferred embodiment of the invention commercial terpineol has been found to comply exceedingly well with the requirements of this invention.

Commercial terpineol is a mixture of alpha terpineol, beta terpineol, terpineol and sometimes also traces of gamma terpineol; it has a pleasant odor and is practically insoluble in water. Its boiling point lies between 410 and 420° F. as compared with 126° F. of butylacetate. The flashpoint has been found to be 208° F., whereas that of butylacetate is 105° F.

Due to the insolubility of the terpineol in water the above referred-to purifying steps are not required; due to its high flashpoint the fire hazard is eliminated and due to its high boiling point no losses are incurred during the treatment of the egg juice. Moreover, the terpineol exerts a sterilizing action on the putrefaction germs generally contained in the egg juice and therefore prevents the awful smell generally developed from egg juice after short periods of storage.

The terpineol may be preferably used at a rate of 3–25% of the egg juice; it is advisable to acidify the egg juice before its treatment is commenced.

The terpineol may be replaced by other menthene alcohols having similar properties relative to the purpose of this invention. However, since these other menthene alcohols are rather expensive the use of commercial terpineol seems to be the best qualified agent for the purification of the egg juice and the recovery of a pure albumin solution from the same.

A detailed mode of carrying out this invention is described as follows:

1000 lbs. of egg juice are pumped into a tank.

Hereupon 7 lbs. of 20% acetic acid are added whereby the solution will be slightly acidified.

100 lbs. of commercial terpineol are now added and well stirred into the solution. After ten minutes of stirring the mixture is allowed to stand, whereby the egg yolk and other impurities containing terpineol solution will accumulate as a top layer.

The aqueous solution is now drawn off and filtered. The solution is clear and has all the properties of a fresh egg albumin solution. Hereupon the solution is evaporated to dryness at a temperature of about 115° F. A pure light colored albumin results.

The terpineol may be recovered from its solution either by direct distillation or by blowing steam over the same.

What I claim is:

1. A method for the manufacture of a water soluble pure egg albumin from the solution adhering to the egg shells after the dumping of the eggs comprising treating the said solution with commercial terpineol, dissolving the egg yolk and egg yolk oil in the terpineol and separating the egg yolk containing terpineol solution from the aqueous albumin solution.

2. A method for the manufacture of a water soluble pure egg albumin from the solution adhering to the egg shells after the dumping of the eggs comprising treating the said solution with commercial terpineol, dissolving the egg yolk and egg yolk oil in the terpineol, accumulating the water insoluble egg yolk containing terpineol solution as a top layer and separating the same from the aqueous albumin solution.

3. A method for the manufacture of a water soluble pure egg albumin from the solution adhering to the egg shells after the dumping of the eggs comprising treating the said solution with commercial terpineol, dissolving the egg yolk and egg yolk oil in the terpineol, accumulating the water insoluble egg yolk containing terpineol solution as a top layer, separating the same from the aqueous albumin solution and evaporating the latter to dryness to obtain a pure light colored albumin.

4. A method for the manufacture of a water soluble pure egg albumin from the solution adhering to the egg shells after the dumping of the eggs comprising treating the said solution with about 3–25% of commercial terpineol, dissolving the egg yolk and egg yolk oil in the terpineol and separating the egg yolk oil containing terpineol solution from the aqueous albumin solution.

5. A method for the manufacture of a water soluble pure egg albumin from the solution adhering to the egg shells after the dumping of the eggs comprising slightly acidifying the said solution, treating the same with about 3–25% of commercial terpineol by stirring, dissolving the egg yolk and egg yolk oil in the terpineol, separating the egg yolk containing terpineol solution from the aqueous albumin solution and evaporating the latter to dryness.

6. A method for the manufacture of a water soluble pure egg albumin from the solution adhering to the egg shells after the dumping of the eggs comprising treating the juice with a mixture of water insoluble terpineols, dissolving the egg yolk and egg yolk oil in the alcohol and separating the alcoholic egg yolk solution from the aqueous albumin solution.

FREDERICK F. POLLAK.

REFERENCES CITED

The following references are of record in the file of this patent:

UNITED STATES PATENTS

| Number | Name | Date |
| --- | --- | --- |
| 2,377,961 | Pollak | June 12, 1945 |